3,419,954
METHOD OF BRAZING ATTACHMENTS ONTO ROTOR BLADE SPARS
Winston E. Brownlee, Suttons Bay, Mich., assignor to Parsons Corporation, Traverse City, Mich., a corporation of Michigan
Continuation-in-part of application Ser. No. 413,199, Nov. 23, 1964. This application Feb. 23, 1966, Ser. No. 529,275
The portion of the term of the patent subsequent to Mar. 8, 1983, has been disclaimed
U.S. Cl. 29—482                                4 Claims
Int. Cl. B23k 1/02; B23k 1/20

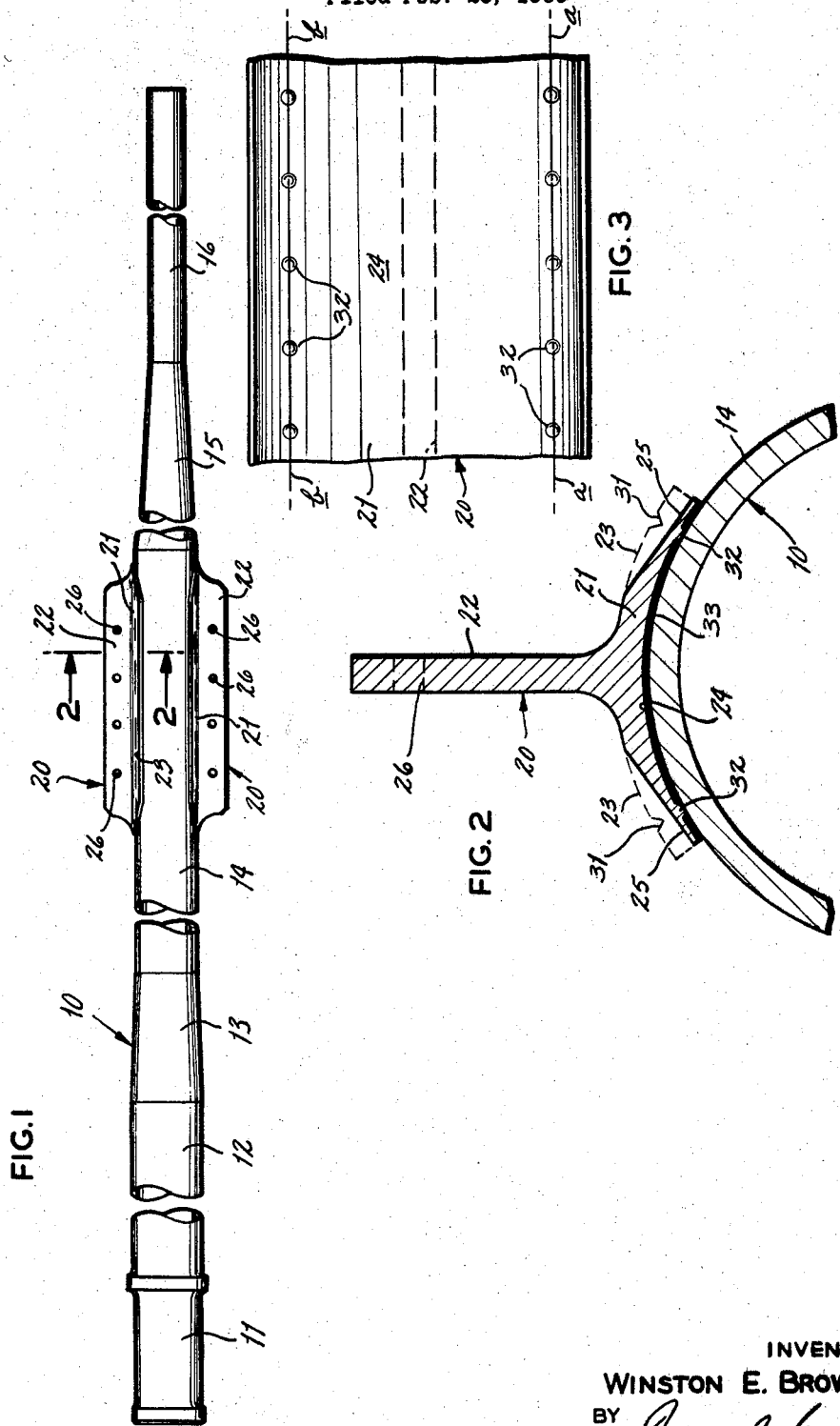

ABSTRACT OF THE DISCLOSURE

A method of brazing attachments, especially useful for constructing steel helicopter rotor blades, positively establishes a desired thickness of brazing alloy. The part to be attached is originally formed with marginal portions thicker than ultimately utilized. Thse are "dimpled" or indented to provide small, equally embossed projections on the under surface. When the parts are assembled and brazed, the brazing alloy flows between them and makes a joint of precisely established thickness. The upper, indented surfaces are then milled to a depth greater than the depth of indenting, removing the indentations which would otherwise result in stress concentrations.

---

The present invention relates to a method of brazing attachments onto steel rotor blade spars. It is a continuation-in-part of my co-pending application, Ser. No. 413,199, Nov. 23, 1964, now Patent No. 3,239,011, entitled, "Helicopter Rotor Blade Spar Structure."

In said co-pending application, I disclose a spar structure including a reinforcing doubler brazed on the root end of an airfoil-contoured steel spar, and I show a line of spacing projections on the doubler undersurface near its taperingly thinned outboard end. These projections are formed by dimpling the upper surface of a constant-thickness, contoured doubler blank, brazing it in place, and then thinning its upper surface taperingly.

The invention here disclosed relates to attaching members to any portion of a steel spar, whether or not that portion has airfoil contour. The problem of brazing such attachments is much the same as the problem stated in my co-pending application—that is, when a broad area is to be brazed, portions of it may lack sufficient brazed material.

Especially critical are the margin regions of the attachment. According to good aeronautical design practice, the margins of thick plates and plate-like attachments ought to be taperingly thinned, so as to achieve the transfer of loads through the brazed joint without abrupt localized stresses. Yet, thinning a margin makes it more flexible. This creating the problem whether when the attachment is clamped in place and brazed, the flow of braze material under the relatively flexible thinned margin may result in a joint of different thickness there than in the regions where the attachment is thicker.

This problem is present in making brazed attachments of many types, an example here illustrated being where the attachment has plate-like marginal portions along parallel edge parts of the attachment. If the attachment be clamped to the spar in place for brazing, there is the danger that even though the thickness of brazed material along one marginal part may be adequate, yet along the other marginal part the braze may be too thin and possess voids.

In order to overcome the problem of assuring a proper thickness of braze material, I provide hereby a process in which I first shape the attachment to include a plate-like marginal portion thicker than that ultimately to be utilized. I then contour the undersurface of the attachment (including such plate-like marginal portion) complementary to the outer surface of the steel spar. I then dimple such thick marginal portions inwardly, toward the contoured undersurface, with a dimpling punch applied with sufficient force to emboss the undersurface with projections which extend an amount equal to the desired thickness of the joint to be brazed. I space the dimples apart from each other and out of linear alignment with a single line. Where the plate-like marginal portions are parallel to each other, as on opposite edges of the attachment, these dimples may be in two parallel lines opposite to each other; the important aspect is that, not being in a single line, they provide the undersurface with spacing projections which support the attachment securely and fix its spacing from the outer surface of the spar at a distance precisely equal to the desired braze joint thickness. I then apply brazing alloy, clamp, and braze in the usual manner. Then I mill the marginal portions to remove material from their outer surface to a depth greater than the depth of dimpling. By this process the intense stress concentration due to dimpling is effectively removed from the attachment.

In the accompanying drawings:

FIG. 1 is an elevational view of a step-tapered steel spar having attachment fins, made and brazed in accordance with the method of the present invention.

FIG. 2 is an enlarged fragmentary section thereof taken along line 2—2 of FIG. 1.

FIG. 3 is a similarly enlarged bottom view of a fragment of the attachment fin typical of that portion adjacent to the section of FIG. 2, shown after dimpling but before brazing.

The spar tube generally designated 10 in FIG. 1 is of the familiar step-tapered design, which has proved suitable for many types of helicopter rotor blades. It includes a root retention grip part 11, a constant root section 12, an inboard tapering section 13, a mid-span constant section 14, an outboard tapering section 15, and a constant tip section 16. Attachments may be brazed to any of these parts; for convenient illustration the brazed attachments here shown are only on the mid-span section 14.

Such an attachment may be a fin, such as the fore and aft fins generally designated 20 in FIG. 1. Attachments such as these fins may be necessary for a variety of purposes well known to helicopter blade designers. The fin 20 may be of a convenient length, such as shown in FIG. 1, and may include a plurality of bores 26 by means of which further blade elements are secured.

Referring to FIG. 2, such a fin 20 is of modified T-section, having an arcuate base flange 21 whose undersurface 24 is contoured complementary to the outer surface of the mid-span section 14. Outstanding from the arcuate base flange 21 is a rib 22, penetrated by the bores 26.

The arcuate base flange 21 is elongated, as shown, and has parallel plate-like marginal portions 23 shown in dashed lines. In the final product, produced by the method of this invention, these plate-like marginal portions have milled tapers 25, thinning their edges in accordance with good aeronautical design practice.

In carrying out the method of the present invention, before such milled tapers 25 are formed I proceed with the following steps:

I shape the fin attachment 20 so as to include along its lengthwise edges a plate-like marginal portion 23, as shown in dashed lines in FIG. 2, so that the initial thickness of this portion 23 is greater than that ultimately to be utilized. I carefully contour the undersurface 24 of the fin 20 so as to complement the outer surface of the spar portion 14 to which it is to be attached (in the particular utilization illustrated, the surface 24 is characterized by a circular arc).

I then dimple the marginal portions 23 inwardly from their initially provided outer surfaces shown in dashed lines in FIG. 2, toward the contoured undersurface 24. I place the fin 20 in a press having a dimpling or indenting punch and die set. By the dimpling or indenting operation, when the metal is dimpled on the outer surface of the marginal portion 23, as by the indentation 31 shown in dashed lines of FIG. 2, the metal "cold-flows" downwardly, and thus the metal in the undersurface opposite is embossed into the die, to provide the rounded embossed projection 32 shown in FIGS. 2 and 3. By starting with plate-like portions 23 of equal thickness and applying the indenting punch with equal force into the identical indenting die, the embossed projections 32 will extend from the surface 24 an identical predetermined distance. I determine this distance so that it will be precisely that of the desired brazed joint thickness, taking into account the particular braze material which is being used and the characteristics of the steel parts which are being so brazed together.

I do not then mill the tapers 25 at this stage in any case where the brazed-together assembly can be milled after brazing. Instead, I clamp together or otherwise suitably secure the parts preliminarily in position for brazing, first having applied a brazing alloy between the undersurface 24 and the outer surface portion 14 of the spar. As so clamped together, the embossed spacing projection 32 will firmly support the fin 20 spaced away from the outer surface of the spar portion 14 at the precise spacing to establish the thickness of the braze joint.

In order to assure such firm support, I make the plurality of dimples 31 out of linear alignment with a single line, thus the attachment cannot rock back and forth along that single line. In the case illustrated, I provide the dimples along two lines a—a and b—b as shown in FIG. 3. These lines are substantially opposite and parallel to each other in the parallel plate-like marginal portions 23.

I then apply brazing heat to the clamped assembly so that the brazed metal flows freely and evenly to form the braze joint 33. This braze joint 33 will be of constant thickness, such as is established by the spacing projections 32, and (except for the tiny spacing projections themselves) this braze joint will be uniform over the entire undersurface 24 of the fin 20.

I then remove the clamps or other securement devices, place the brazed spar assembly in a milling machine, and mill the tapers 25 to remove the steel material from the outer surface of the plate-like marginal portions 23 to a depth greater than the depth of dimpling.

By removing this material the predicted stress concentrations from dimpling will no longer impair the security of the structure. It appears that such stress concentrations from dimpling exist principally at the indented upper surface of the plate-like marginal portions 23. This concentration factor is not applicable, to any serious extent, to the material beneath the indentations, which material flows toward the undersurface and provides the embossed spacing projections 23. Upon removal of the material indented, to a depth greater than the depth of dimpling, the danger of failure because of stress concentration is satisfactorily overcome. Thus I utilize the spacing effect of embossing without suffering the dangers of stress concentration incident to dimpling.

If the assembly cannot be conveniently milled after brazing, I instead mill the plate-like marginal portions 23 to form the taper 25 prior to clamping up the assembly with the braze material. This alternative requires extra care however; such milled tapers 25 render the marginal portions more flexible, creating the danger of bending flexure of the undersurface 24 before the braze material has set. By care in clamping, distortion due to such flexibility can be minimized; and the embossed spacing projections 32 will thus aid in achieving a uniform braze joint 33.

In this description I have referred to the brazing of steel rotor blade spars to secure steel attachments thereon. The method of this invention is not however inherently limited to steel parts nor to joining processes which may be technically known as brazing. It has application to the attachment of any metal part capable of cold flow so that indenting one surface may emboss the opposite surface; and to any joining material, in addition to brazing alloys, which flows under heat applied in the joining process. Accordingly the present invention is not to be construed narrowly, but as fully co-extensive with the claims.

I claim:
1. The method of making and brazing a steel attachment onto a steel rotor blade spar,
   comprising the steps of
   shaping such attachment to include a plate-like marginal portion whose thickness is greater than that ultimately to be utilized, and contouring the undersurface of said attachment including said plate-like marginal portion to complement the outer surface of that part of the steel spar to which it is to be attached,
   then dimpling said marginal portion inwardly from its outer surface toward its contoured undersurface with a plurality of dimples spaced apart and out of linear alignment with a single line, thereby to provide said undersurface with rounded embossed projections extending therefrom a distance equal to the desired braze joint thickness,
   then applying a brazing alloy between the entire undersurface of the attachment and the outer surface of the spar to which it is to be brazed and preliminarily clamping the spar and attachment together in position for brazing, whereby the embossed spacing projections support and fix the spacing of the attachment from the outer surface of the spar,
   then applying brazing heat to the clamped assembly, and
   then removing material from the outer surface of the plate-like marginal portion to a depth greater than the depth of dimpling,
   whereby the region of intense stress concentration is effectively removed.
2. The method defined in claim 1,
   wherein the shaping to include a marginal plate-like portion includes providing such portion in two parallel parts, and
   wherein the dimples so out of linear alignment with a single line are aligned substantially opposite to each other in the said parallel parts.
3. The method defined by claim 1,
   modified in that the there-defined step of removing material from the outer surface of the plate-like marginal portion is performed prior to the there-defined steps of applying the braze material, clamping and brazing.
4. For joining to a metal structural member, by a heat-flowing joining material, an attachment formed of a metal characterized by cold flow when indented,
   the process comprising the steps of
   shaping such attachment to include a plate-like marginal portion whose thickness is greater than that ultimately to be utilized, and contouring the undersurface of said attachment including said plate-like marginal portion to complement the outer surface of that part of the structural member to which it is to be attached,
   then indenting said marginal portion inwardly from its outer surface toward its contoured undersurface with a plurality of indentations spaced apart and out of linear alignment with a single line, and by so indent- ing, causing cold flow of the metal whereby to emboss the undersurface with rounded embossed projections extending therefrom a distance equal to the desired joint thickness, then applying a heat-flowing joining material between the entire undersurface of the attachment and the outer surface of the structural member to which it is to be joined and preliminarily clamping the member and attachment together in position for joining, whereby the embossed spacing projections support and fix the spacing of the attachment from the outer surface of the structural member, then applying heat to flow the joining material and join the clamped assembly, and then removing metal from the outer surface of the plate-like marginal portion of the attachment to a depth greater than the depth of indenting, whereby the region of intense stress concentration attendant to indenting is effectively removed.

References Cited

UNITED STATES PATENTS

| | | | |
|---|---|---|---|
| 1,916,989 | 7/1933 | Rader | 29—501 X |
| 2,040,092 | 5/1936 | Leedy | 29—501 XR |
| 2,062,841 | 12/1936 | Stefancky | 29—482 XR |
| 2,615,236 | 10/1952 | Stulen et al. | 29—481 X |
| 2,723,445 | 11/1955 | Trautvetter | 29—481 X |
| 2,932,884 | 4/1960 | Lyon | 29—481 X |
| 3,055,097 | 9/1962 | Douglas | 29—475 X |
| 3,239,011 | 3/1966 | Brownlee | 170—159 |

JOHN F. CAMPBELL, *Primary Examiner.*

JOHN CLINE, *Assistant Examiner.*

U.S. Cl. X.R.

29—500, 501, 475